S. W. SPANGLER & C. L. KLAPP.
FILM MARKING CAMERA.
APPLICATION FILED NOV. 20, 1916.
1,259,152.
Patented Mar. 12, 1918.
3 SHEETS—SHEET 1.
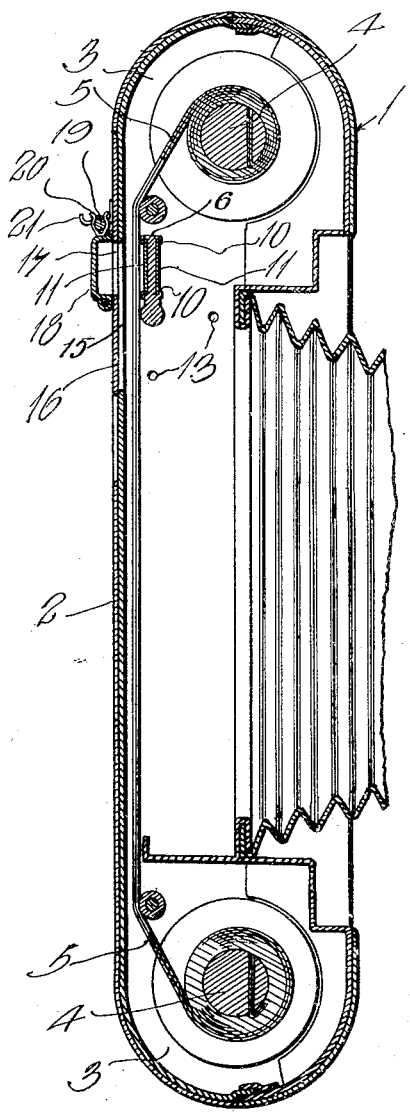
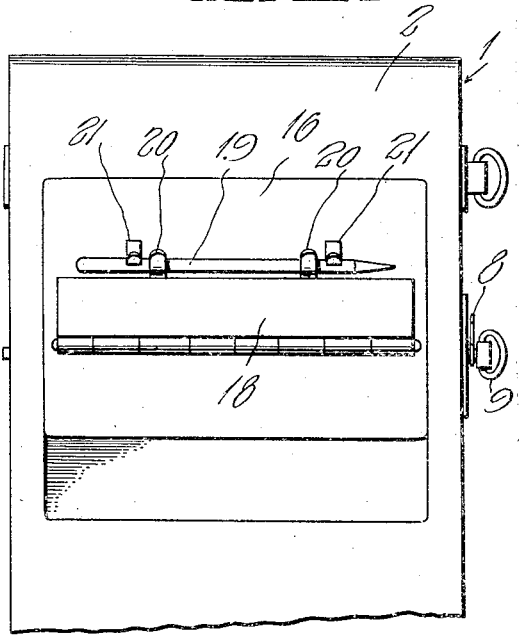
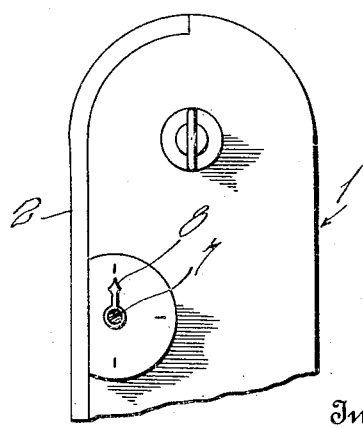
Witness
H. Woodard
Inventors
S. W. Spangler
& C. L. Klapp
By H. B. Willson & Co.
Attorneys

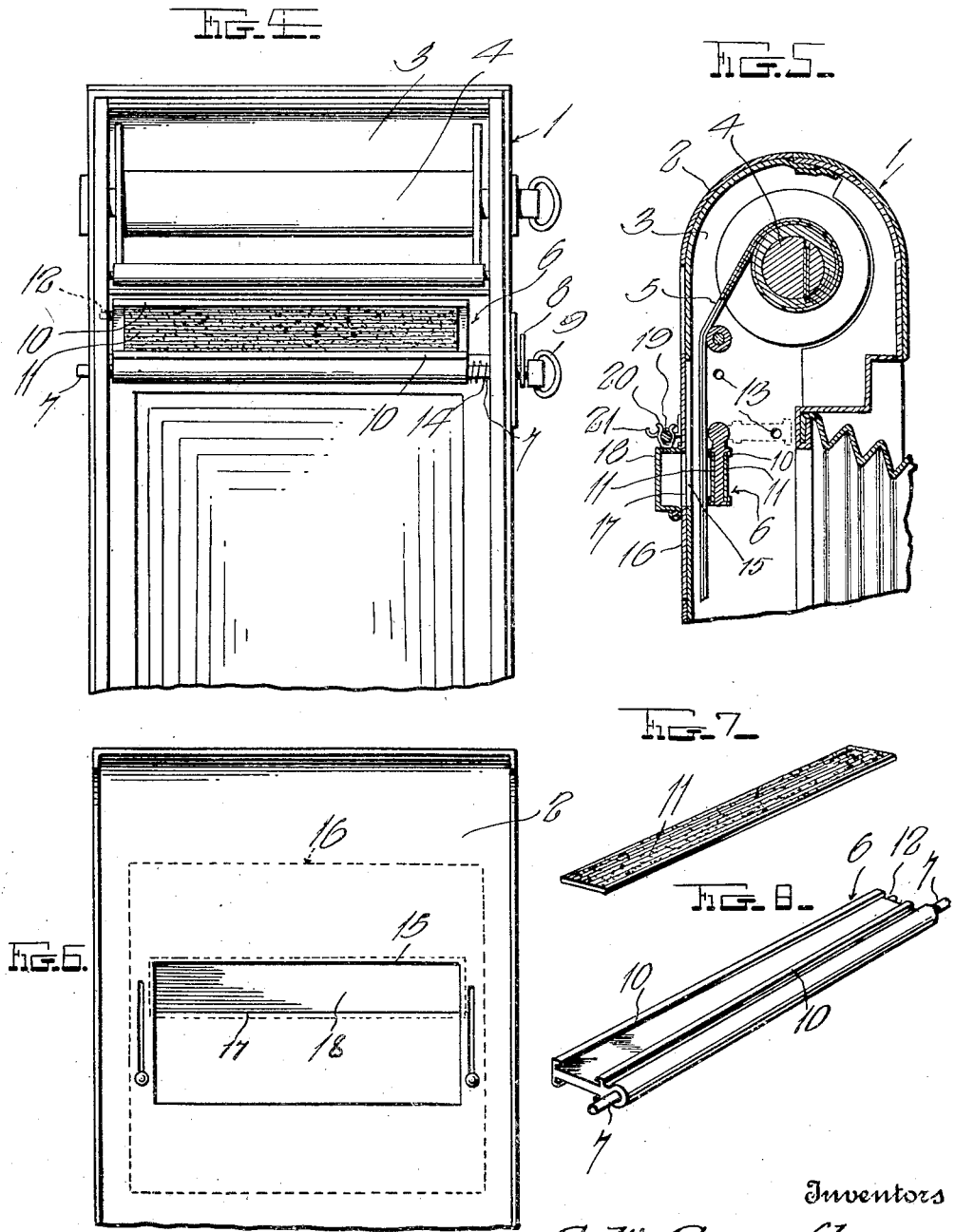

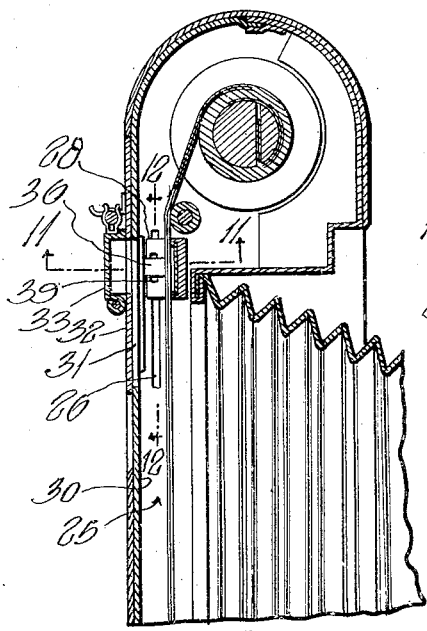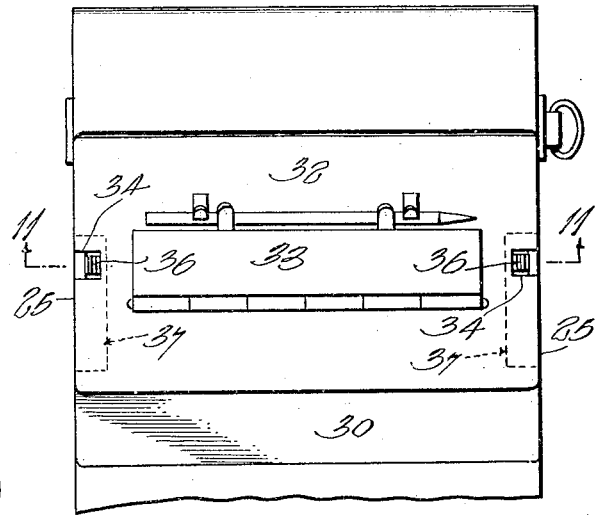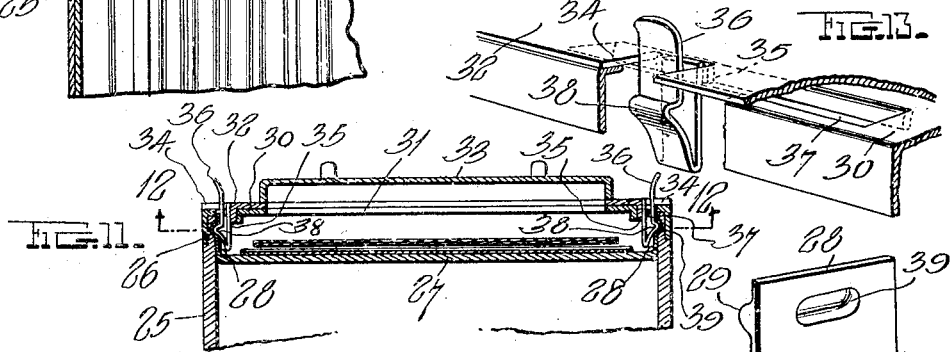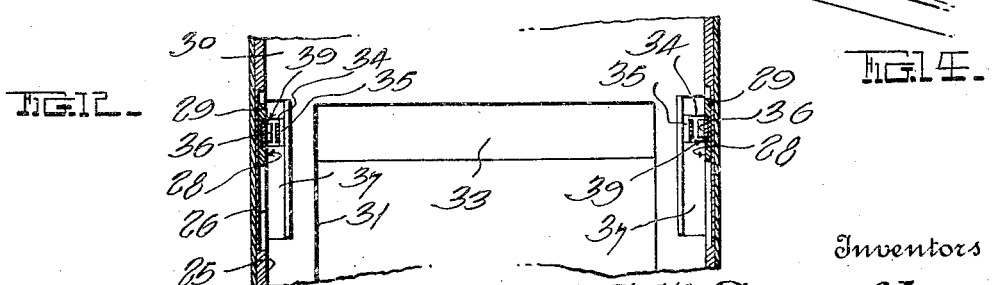

UNITED STATES PATENT OFFICE.

SAMUEL W. SPANGLER, OF BLYTHEVILLE, AND CHARLES LAFAYETTE KLAPP, OF JONESBORO, ARKANSAS.

FILM-MARKING CAMERA.

1,259,152.

Specification of Letters Patent.

Patented Mar. 12, 1918.

Application filed November 20, 1916. Serial No. 132,404.

*To all whom it may concern:*

Be it known that we, SAMUEL W. SPANGLER, a citizen of the United States, residing at Blytheville, in the county of Mississippi, State of Arkansas, and CHARLES L. KLAPP, a citizen of the United States, residing at Jonesboro, in the county of Craighead and State of Arkansas, have invented certain new and useful Improvements in Film-Marking Cameras; and we do declare the following to be a full, clear, and exact description of the invention, such as will enable others skilled in the art to which it appertains to make and use the same.

Our invention has for its principal object to provide an improved means for use on the so called autographic cameras used for marking films when the same are exposed, the improvements residing in providing a platen having a transferable film marking pigment over which the film is drawn, whereby when the latter is forced against said pigment by the usual stylus or the like, the film will be marked accordingly.

A further object is to provide a film marking device movable to a plurality of positions to permit marking of the film either at one end of the exposed area or within this area.

With the foregoing general objects in view, the invention resides in certain novel features of construction, and in unique combinations of parts to be hereinafter fully described and claimed, the descriptive matter being supplemented by the accompanying drawings which constitute a part of this application and in which:

Figure 1 is a longitudinal section of the camera constructed in accordance with the invention;

Fig. 2 is a partial rear elevation;

Fig. 3 is a fragmentary edge view;

Fig. 4 is a rear elevation with the camera back removed;

Fig. 5 is a view similar to Fig. 1 showing a different position of parts;

Fig. 6 is an interior elevation of part of the camera back;

Fig. 7 is a perspective view of one of the slides upon which the transferable pigment is carried;

Fig. 8 is a perspective view of the shiftable platen which supports the slides;

Fig. 9 is a vertical section similar to Fig. 1, showing a different form of the invention;

Fig. 10 is a rear elevation of the type of the device shown in Fig. 9;

Fig. 11 is a detail sectional view on the plane of the line 11—11 of Fig. 9;

Fig. 12 is a similar view on the plane designated by the lines 12—12 of Figs. 9 and 11;

Fig. 13 is a detail perspective view of a portion of a camera back and slide mounted thereon showing more particularly the construction of the catch for holding the camera back in operative position; and Fig. 14 is a similar view of a part of the platen employed in the type of the invention shown in Figs. 9 to 13.

In Figs. 1 to 8 of the drawings above briefly described, the numeral 1 designates a common type of camera case having the usual removable back 2 and magazines 3, the latter containing the reels 4 from one of which to the other the sensitized film 5 is wound in the well known manner.

A rectangular elongated platen 6 extends transversely across the case 1 adjacent one of the magazines 3, said platen being of any preferred construction and having pintles 7 projecting from its opposite ends so as to rockably support said platen on an axis extending along one of its edges. Both pintles 7 are mounted in suitable openings in the sides of the camera case and one of said pintles carries a pointer 8 and a folding operating key 9 both located on the exterior of the case. Pointer 8 coöperates with suitable indicating means so that the position of the platen 6 within the case may be readily ascertained from the exterior thereof.

The opposed flat sides of the platen 6 are provided with parallel channel-shaped guide flanges 10 on their opposite edges, said flanges receiving therebetween slides 11 of any suitable material coated with a transferable film marking pigment of any appropriate or desired color. When the back 2 is removed, the slides 11 may be withdrawn and recoated, or else new slides may be substituted for those previously used, it being understood, however, that this change need not be often made.

As shown clearly in Fig. 1, the film 5 passes over the platen 6 and is spaced an infinitesimal distance therefrom by the flanges 10, but when a stylus or the like is used on the rear face of the film, it is pressed into contact with the transferable pigment on the active slide 11 with the result that the film will be marked according to the manner in which the stylus is used. When the platen 6 is swung toward the magazine 3 adjacent which it is located, the marking of the film will take place at one end thereof, but by turning said platen inwardly away from said magazine, the film may be marked within the area which has been exposed. Also, when the platen 6 stands in a neutral position, the marking of the film is impossible.

For holding platen 6 in its adjusted positions, the end thereof remote from the key 9 is provided with a stud 12 for reception in any one of the trio of sockets 13 in the inner face of one side of the camera case 1, a coil spring 14 being provided for shifting the platen endwise so as to yieldably hold said stud in any required socket 13. When adjustment of the platen is to be made, the key 9 is unfolded and pulled outwardly to remove the stud 12 from the socket in which it has previously been seated, the turning of said key now moving the platen to the desired position, which may be ascertained from the exterior of the camera case by the pointer 8. The platen having been adjusted as required, the spring 14 will shift it longitudinally to insert stud 12 in one of the sockets 13 to hold said platen against further movement until necessary.

The film is accessible by means of an opening 15 in the camera back 2, said back being provided with a slide 16 disposed over said opening 15 as shown most clearly in Figs. 1 and 2. Slide 16 is formed with an opening 17 of substantially the size of the platen 6, this opening being normally closed by a door 18 which is preferably, though not necessarily, hinged. When the platen 6 is swung outwardly for marking the film at the end of the latter, the slide 16 will be shifted so as to dispose the opening 15 immediately over said platen. By means of the usual or any suitable stylus 19, the film may now be pressed against the active pad 11, the door 18 having been previously opened. When the position of the platen 6 is reversed, the slide will be shifted in the opposite direction so as to maintain the opening 17 in proper relation to said platen.

The stylus 19 is preferably carried within a pair of U-clips 20 on the free edge of the door 18 and the ends of said stylus are adapted to snap into other clips 21 carried by the slide so that the device in question serves to hold the door 18 in closed position.

In Figs. 9 to 14, a different type of the invention is shown. In these figures the parallel sides 25 of the camera case are provided on their inner sides, at the rear edges thereof, with longitudinally extending grooves 26 and the pigment carrying platen 27 is provided with laterally extending end flanges 28 having ribs 29 received slidably in said grooves so that the platen may be shifted to two or more positions for marking the film at different points.

The camera back 30 has formed therein an opening 31 by means of which the film is accessible and a slide 32 operates over this portion of said back, said slide being itself formed with a suitable opening closed by a door 33 corresponding to the door 18 above described. The edges of the slide 32 are formed with suitable notches 34 and the material at the inner ends of these notches is preferably bent inwardly to form flanges 35 by means of which a pair of spring catches 36 are secured to the slide, said catches extending through longitudinal slots 37 in the edges of the back 30 and having external ribs 38 for reception in sockets 39 formed in the inner sides of the flanges 28. By the construction just described the spring catches 36 serve not only to connect the slide 32 with the platen 27 but clamp the entire camera back 30 removably on the camera case.

By moving the slide 32 to the proper extent the platen 27 will be shifted therewith for the purpose of marking the film at the required point, it being of course necessary to first open the door 33. In this type of the invention, therefore, it is not necessary to adjust the slide and the platen independently of each other but the two adjustments are simultaneously made, thus rendering the form in question more easy to operate than that previously described.

From the foregoing description, it will be observed that we have provided extremely simple and inexpensive, yet efficient and durable means for carrying out the objects of the invention, but it is to be understood that within the scope of the appended claims, numerous changes may be made without sacrificing the principal objects. Furthermore, although the invention is only shown and described as applied to one particular type of camera, it will be obvious that it can be employed with any of the other kinds of cameras.

We claim:

1. A film marking camera having means for accommodating a sensitized film, and a film marking member movable to a plurality of operative positions in the camera case and carrying a transferable pigment.

2. A camera comprising a case having means for accommodating a sensitized film, a slide mounted on said case and movable longitudinally of the film path, said slide having an opening through which the film backing is accessible for using a stylus thereon, and a door for said opening movable bodily with said slide.

3. A camera comprising a case, a film marking member in said case, said member being shiftable to a plurality of positions along the film path and carrying a transferable film marking pigment, and a slide mounted on the case and having a door through which a stylus may be used for forcing the pigment and film into contact, said slide serving to permit marking of different areas of the film according to the position of the marking member.

4. A camera having means for accommodating a sensitized film, a platen immediately in advance of the film path and carrying a transferable pigment for marking said film, and a slide connected with said platen and shiftable longitudinally of the film, said slide having a normally closed opening through which the film is accessible for the purpose of forcing the same against the pigment by means of a stylus.

5. A film marking camera having means for accommodating a sensitized film, and a film supporting platen slidably mounted in the camera case immediately in advance of the path of the film for movement longitudinally of the latter.

6. A film-marking camera having means for accommodating a sensitized film, a film supporting platen extending across the camera case immediately in advance of the film path and laterally extending end flanges on said platen slidably supported by the sides of the camera case.

7. A film-marking camera comprising a case having means for accommodating a sensitized film, the sides of said case having internal grooves extending longitudinally of the film path adjacent the edges of the latter, a platen extending across the case immediately in advance of said film path, and laterally extending end flanges on said platen having ribs slidable in the aforesaid grooves.

8. A camera comprising a case having means for accommodating a sensitized film, a platen mounted slidably in said case immediately in advance of the film path and carrying a film marking pigment, a slide carried by the camera back and having a normally closed opening for giving access to the film for the purpose of forcing it against the pigment with a stylus, and means connecting the slide and platen.

9. A camera comprising a case having a detachable back and equipped with means for accommodating a sensitized film, a platen mounted in the camera case immediately in advance of the film path, a slide carried by the aforesaid camera back and having an opening through which a stylus may be used, and means for detachably connecting the slide with the platen.

10. A camera comprising a case having a detachable back and equipped with means for accommodating a sensitized film, a platen mounted slidably in the camera case immediately in advance of the film path, a slide carried by the aforesaid camera back and having an opening through which a stylus may be used, and a pair of spring catches carried by the slide for connecting the same detachably with the platen.

11. A camera comprising a case having means for accommodating a sensitized film and equipped with a removable back, a slide carried by said back and constructed for giving access to the film backing, and a platen connected to said slide for movement therewith, said platen being disposed in advance of the film path and carrying a film marking pigment.

12. A camera comprising a case having a detachable back and equipped with means for accommodating a sensitized film, the sides of said case being formed with longitudinal grooves adjacent said back, a platen in advance of the film path and carrying a film marking pigment, flanges on said platen having ribs received slidably in the aforesaid grooves, the inner faces of said flanges having sockets, a slide carried by the camera back and constructed for giving access to the film backing for forcing the film against the pigment, and a pair of spring catches carried by said slide and extending through slots in the camera back for coöperation with the aforesaid sockets to connect said slide and platen.

13. A camera comprising a case having means for accommodating a sensitized film, and a film marking member in said case movable relatively to the film path for marking the film on equal spaced areas without adjusting said film.

14. A camera comprising a case having a detachable back and equipped with means for accommodating a sensitized film, a film marking member movably mounted in said case, a slide carried by said camera back and having means for giving access to the interior of the case for marking the film by means of said marking member, and means detachably connecting said slide and said marking member for movement in unison.

15. A camera comprising a case having a detachable back and equipped with means for accommodating a sensitized film, a film marking member movably mounted in said case, a slide carried by said camera back and having means for giving access to the interior of the case for marking the film by means of said marking member, and a pair of spring catches for detachably connecting said slide and said marking device for movement in unison.

16. A camera having means for accommodating a sensitized film and also having a door movable to different positions and operative in each position to expose an equal area of the film backing so that a stylus may be operated thereon.

17. A film-marking camera comprising a case having means for accommodating a sensitized film, and a platen in advance of the film path and movable to different operative positions in the case, said platen being adapted to receive the film thereon when said film is forced forwardly by a stylus.

In testimony whereof we have hereunto set our hands in the presence of two subscribing witnesses.

SAMUEL W. SPANGLER.
CHARLES LAFAYETTE KLAPP.

Witnesses to the signature of S. W. Spangler:
THOMAS F. FLOURNOY,
C. H. HOLMES.

Witnesses to the signature of C. L. Klapp:
J. R. GREGSON,
A. E. FORTINBERRY.

Copies of this patent may be obtained for five cents each, by addressing the "Commissioner of Patents, Washington, D. C."